(12) United States Patent
Schucker et al.

(10) Patent No.: US 10,198,326 B2
(45) Date of Patent: Feb. 5, 2019

(54) INTELLIGENT RESTORATION OF A COMPUTING DEVICE

(71) Applicant: APPLE INC., Cupertino, CA (US)

(72) Inventors: Daniel D. Schucker, Dublin, CA (US); Amit K. Vyas, San Jose, CA (US); Albert S. Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 15/454,883

(22) Filed: Mar. 9, 2017

(65) Prior Publication Data

US 2018/0260124 A1    Sep. 13, 2018

(51) Int. Cl.
*G06F 11/14* (2006.01)

(52) U.S. Cl.
CPC .................. *G06F 11/1469* (2013.01)

(58) Field of Classification Search
CPC .................................................... G06F 11/1469
See application file for complete search history.

(56) References Cited

U.S. PATENT DOCUMENTS

| | | | |
|---|---|---|---|
| 7,353,355 B1 | 4/2008 | Tormasov et al. | |
| 7,409,586 B1 * | 8/2008 | Bezbaruah | G06F 11/0727 714/13 |
| 7,725,704 B1 | 5/2010 | Beaverson et al. | |
| 8,209,290 B1 * | 6/2012 | Dowers, II | G06F 17/30289 707/640 |
| 8,463,798 B1 * | 6/2013 | Claudatos | G06F 17/30144 707/752 |
| 9,213,706 B2 | 12/2015 | Long et al. | |
| 9,298,561 B1 | 3/2016 | Sawhney et al. | |
| 2003/0177324 A1 * | 9/2003 | Timpanaro-Perrotta | G06F 11/1448 711/162 |
| 2007/0294320 A1 * | 12/2007 | Yueh | G06F 11/1469 |
| 2012/0005379 A1 * | 1/2012 | Dutch | G06F 11/1448 710/31 |

(Continued)

FOREIGN PATENT DOCUMENTS

CN    105630628 A  *  6/2016

OTHER PUBLICATIONS

Choi et al. "Thermal-aware Task Scheduling at the System Software Level." Aug. 2007. ACM. ISLPED '07. pp. 213-218.*

(Continued)

*Primary Examiner* — Nathan Sadler
(74) *Attorney, Agent, or Firm* — Fletcher Yoder PC

(57) ABSTRACT

In some implementations, a system can intelligently restore data to a user's computing device. For example, the system can prioritize data to be restored to a user device based on the data that the user is most likely to use. The system can restore high priority data items first while delaying restoration of low priority data items. The system can control when data restoration is performed based on device conditions. For example, the device conditions can include how much of an energy budget and/or data budget remains for downloading data to the user device. The device conditions can include the thermal condition (e.g., how hot) of the user device. If device conditions do not allow for downloading data at a particular time, then the device can delay downloading data until the device conditions allow for downloading and/or restoring the data.

21 Claims, 7 Drawing Sheets

(56) References Cited

U.S. PATENT DOCUMENTS

2012/0310894 A1* 12/2012 Freedman ........... G06F 11/1402
                                              707/674
2012/0311280 A1* 12/2012 Schmidt .............. G06F 11/1469
                                              711/162
2015/0088831 A1*  3/2015 Hamborg ............ G06F 11/1464
                                              707/652

OTHER PUBLICATIONS

Translation of CN-105630628.*
Jeff Benjamin. "How-To: Prioritize app downloads on iOS 10 after performing a restore [Video]." Sep. 2016. https://9to5mac.com/2016/09/28/how-to-prioritize-app-downloads-ios-10-restore/.*

* cited by examiner

INTELLIGENT RESTORATION OF A COMPUTING DEVICE

TECHNICAL FIELD

The disclosure generally relates to restoring data on a computing device from network sources.

BACKGROUND

As cloud computing and storage options grow, more and more users are choosing to back up the data on their computing devices to cloud storage servers (e.g., network servers). One of the benefits of backing up the data to the cloud, is that the user can automatically configure a new device or reconfigure an old device based on the data stored in the cloud storage servers. However, the process of restoring the data to the user's computing device (e.g., old device or new device) can use a lot of computing resources (e.g., battery power, network bandwidth, CPU cycles, etc.) and may cause the user device to temporarily operate at a suboptimal level (e.g., generate heat, respond slowly to user input, etc.). Thus, a more intelligent mechanism for restoring data to a user's device is needed that will improve the user's experience when using the user's computing device during the data restoration process.

SUMMARY

In some implementations, a system can intelligently restore data to a user's computing device. For example, the system can prioritize data to be restored to a user device based on the data that the user is most likely to use. The system can restore high priority data items first while delaying restoration of low priority data items. The system can control when data restoration is performed based on device conditions. For example, the device conditions can include how much of an energy budget and/or data budget remains for downloading data to the user device. The device conditions can include the thermal condition (e.g., how hot) of the user device. If device conditions do not allow for downloading data at a particular time, then the device can delay downloading data until the device conditions allow for downloading and/or restoring the data.

Particular implementations provide at least the following advantages. The data items (e.g., applications, application data, etc.) that the user is most likely to use can be restored to a user's device first thereby allowing the user access to the user's favorite data. By deferring restoration of lower priority data, battery usage during the restoration process can be minimized. Similarly, by deferring restoration of lower priority data, network data usage during the restoration process can be minimized. Additionally, by deferring restoration of lower priority data, the user's device has to do less work (e.g., fewer CPU cycles) to restore the device to a level of operability that is useful to the user. By requiring the device's CPU to perform fewer operations, the CPU produces less heat and remains available to respond to user requests, thereby improving the user's experience while using the user device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Storing Restoration Data

Figure 1:
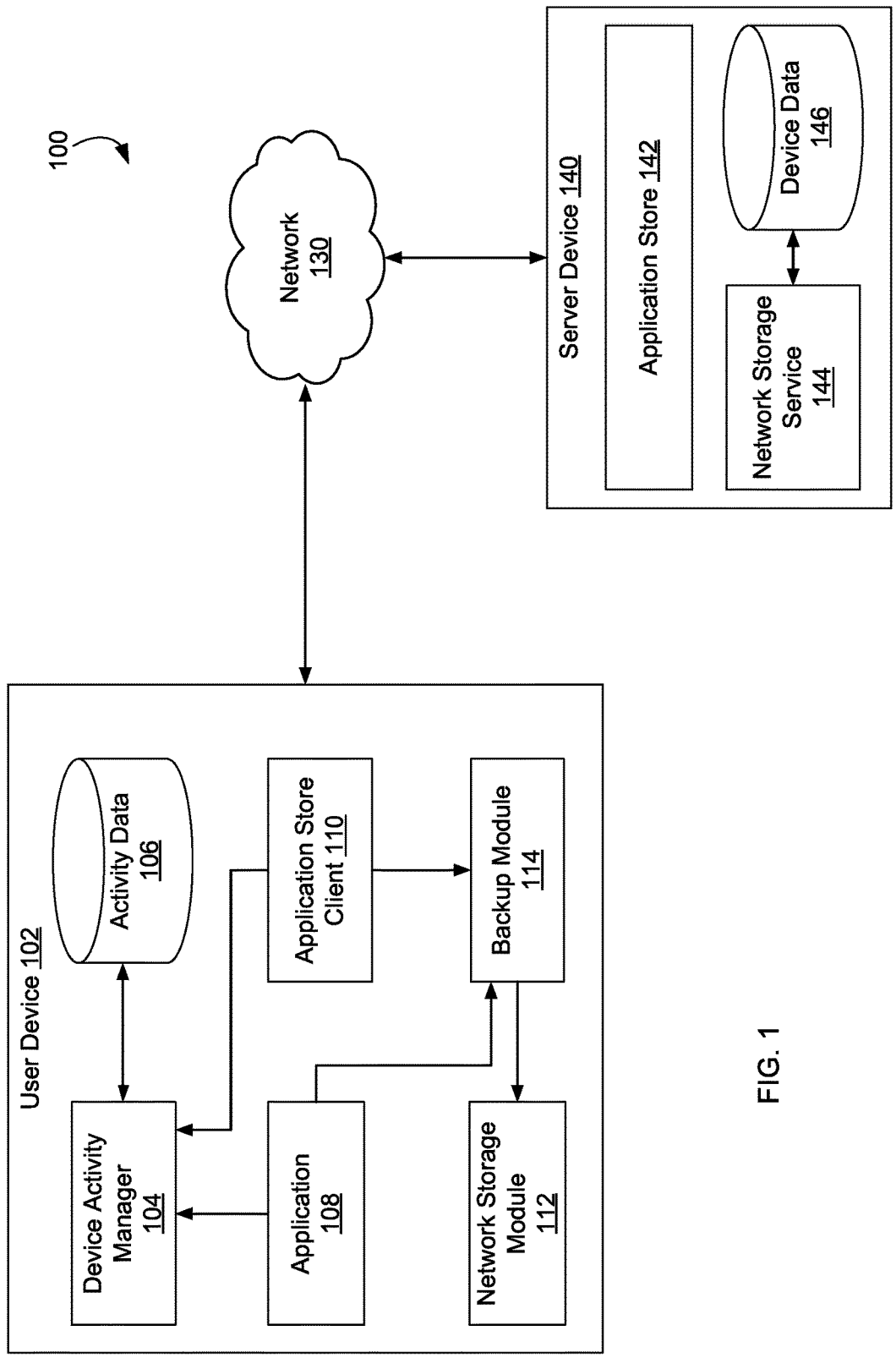
FIG. 1 is a block diagram of an example system for backing up data for intelligently restoring data to a user device.

FIG. 1 is a block diagram of an example system 100 for backing up data for intelligently restoring data to a user device. For example, system 100 can collect and/or store data that can be used by user device 102 for intelligently restoring data to the user device. User device 102 can, for example, utilize application and/or application data usage information to determine which applications (e.g., processes, device services, daemons, utilities, third party applications, etc.) and/or data (e.g., application data, user data, etc.) a user is most likely to use. User device 102 can then prioritize the restoration of applications and/or data that the user is likely to use over applications and/or data the user is less likely to use.

In some implementations, system 100 can include user device 102. For example, user device 102 can be a computing device, such as a laptop computer, smartphone, tablet computer, smartwatch, smart glasses, or any other type of mobile or wearable device.

In some implementations, user device 102 can include device activity manager 104. For example, device activity manager 104 can collect usage data from various applications running on user device 102 and store the usage data in activity data database 106. The usage data can, for example, identify applications, device functions, operating system utilities, user interfaces, etc., that are invoked or used by the user of user device 102. The usage data can identify assets (e.g., files, images, songs, movies, etc.) accessed, selected, viewed, downloaded, etc., by the user. For example, when any application is invoked by the user on user device 102, the invoked application can send a message to device activity manager 104 indicating that the application was invoked. When the user opens an asset using an application, the application can send a message to device activity manager 104 indicating that the asset was selected or opened by the user. In response to receiving the messages, device activity manager 104 can store a record in activity data 106 identifying the invoked application or selected asset. The record can also include a timestamp indicating when the application invocation and/or asset selection occurred. Based on the usage data stored in activity data database 106, device activity manager 104 can determine which applications and/or assets the user has recently used, for example, and may predict which applications the user is most likely to use in the future.

In some implementations, user device 102 can include application 108. For example, application 108 can be an application that comes preconfigured on user device 102 from the manufacturer of user device 102. Application 108 can be a third party application that the user of user device 102 downloads to and/or installs on user device 102 (e.g., using application store client 110). Application 108 can be configured to report usage data to device activity manager 104, as described above. For example, application 108 can send messages to device activity manager 104 indicating that application 108 has been invoked by the user of user device 102. Application 108 can send messages to device activity manager 104 identifying assets (e.g., files, songs, images, movies, messages, etc.) that the user has opened or interacted with using application 108.

In some implementations, application 108 can be configured to back up assets to network storage. For example, application 108 can send (e.g., periodically, or in response to some event) assets or asset identifiers associated with application 108 to backup module 114. Backup module 114 can then store the a list of asset identifiers for assets that are to be backed up to network storage and send the identified assets to server device 140 through network 130 (e.g., LAN, WAN, Internet, etc.) for storage. Server device 140 can then store the assets in device data database 146 in association with a user account identifier (e.g., application store account identifier) corresponding to the user account identifier for the user of user device 102, the identifier for user device 102, and/or the application identifier for application 108.

In some implementations, application 108 can be configured to back up user data associated with application 108 to network storage. For example, user data can be configuration data for the application, user created files or assets, or any other data generated by the user through application 108. Application 108 can send (e.g., periodically, in response to an event, etc.) the user application data to backup module 114. Backup module 114 can store a list of identifiers identifying the application user data and send the application user data to network storage module 112 for backup on a network storage device (e.g., server device 140). For example, network storage module 112 can provide an application programming interface (API) for storing application user data on a server device 140. Network storage module 112 can communicate through network 130 with network storage service 144 running on server device 140 to cause network storage service 144 to store the application user data in device data database 146. For example, network storage module 112 can receive the application user data from application 108 and send the application user data to network storage service 144. Network storage service 144 can then store the application user data in device data database 146 in association with the user account identifier for the user of user device 102, the identifier for user device 102, and/or the application identifier for application 108.

In some implementations, user device 102 can include application store client 110. For example, application store client 110 can be an application on user device 102 that provides an interface to application store 142 on server device 140. A user can interact with application store client 110 to download and/or install applications (e.g., application 108) on user device 102.

In some implementations, application store client 110 can have the same or similar backup and restore features as application 108. For example, application store client 110 can report usage data to device activity manager 104. When a user invokes application store client 110, application store client 110 can report the invocation even to device activity manager 104. When a user downloads and/or installs a new application through application store client 110, application store client 110 can report the download and/or installation event to device activity manger 104. Device activity manager 104 can then store records describing these events in activity data database 106, as described above.

In some implementations, application store client 110 can send information describing applications installed on user device 102 to backup module 114. For example, application store client 110 can maintain a list, record, manifest, database, etc., of applications downloaded to and/or installed on user device 102. Application store client 110 can send (e.g., periodically, in response to an event) the installed applications list to backup module 114. Backup module 114 can store the installed applications list so that the list can be used to perform device and/or application restoration operations, as described further below.

In some implementations, application store client 110 can send application user data to backup module 114 for storage at a network storage device. For example, application store client 110 can send (e.g., periodically, in response to some event, etc.) application user data describing user preferences, browsing history, and/or other application user data to backup module 114. Backup module 114 can send the application user data to network storage module 112 for storage at server device 140. For example, network storage module 112 can send the application user data to network storage service 144 through network 130. Upon receipt of the application user data, network storage service 144 can store the application user data in device data database 146 in association with the user account identifier for the user of user device 102, the identifier for user device 102, and/or the application identifier for application store client 110.

In some implementations, user device 102 can include backup module 114. For example, backup module 114 can manage backup data (e.g., restore data) for user device 102. As described above, applications (e.g., application 108, application store client 110, etc.) on user device 110 can send information identifying application assets, application user data, etc., to backup module 114. Backup module 114 can cause the identified application assets and/or application user data to be stored on a network server (e.g., server device 140) so that the application assets and/or application user data can be later restored to user device 102 from the network server.

In some implementations, backup module 114 can store additional backup data for user device 102 at server device 140. For example, backup module 114 can send the activity or event data stored in activity data database 106 to network storage service 144 on server device 140 for storage in device data database 146. For example, network storage service 144 can store the activity data in database 106 in association with a user account identifier corresponding to the user of user device 102, the identifier for user device 102, and/or an identifier for device activity manager 104.

In some implementations, the additional backup data can include the identifiers for application assets and/or application user data backed up at server device 140. For example, backup module 114 can send (e.g., periodically, in response to an event, etc.) the information identifying the assets and/or application user data that backup module 114 has previously backed up to server device 140 to network storage service 144. Network storage service 144 can then store the asset identification information and/or application user data identification information in device data database 146. For example, network storage service 144 can store the asset identification information and/or application user data identification information in association with a user account identifier for the user of user device 102, the identifier for user device 102, and/or an identifier for backup module 114.

In some implementations, system 100 can include server device 140. For example, server device 140 can correspond to a single server device. Server device 140 can correspond to multiple server devices that work together to provide the features, services, and/or operations as described herein with reference to server device 140. For example, server device 140 can represent multiple server devices that are configured with the same software that perform the same tasks (e.g., application store 142, network storage service 144, device data database 146) and that coordinate and/or synchronize operations across a distributed server system. Server device 140 can represent multiple server devices that are configured with different software that perform the different tasks (e.g., application store 142 on one server device, network storage service 144 and device data database 146 on another server device) and that coordinate and/or synchronize operations across a distributed server system.

In some implementations, server device 140 can include application store 142. For example, application store 142 can be a service that allows users of user devices (e.g., user device 102) to purchase and download applications to their respective user devices. The user of user device 102 can interact with application store client 110, for example, to purchase and download applications from application store 142 and install the applications on user device 102. Application store 142 can maintain a record of which applications a user has downloaded to which user devices. For example, application store 142 can maintain a database that maps application identifiers corresponding to applications that the user has purchased and/or downloaded to various user devices to user account identifiers and/or user device identifiers for the user and/or user devices.

In some implementations, server device 140 can include network storage service 144. For example, network storage service 144 can be configured to provide a cloud storage service to user devices (e.g., user device 102). Applications (e.g., application 108) and/or services (e.g., backup module 114) running on user device 102 can communicate with network storage service 144 to store device data (e.g., application assets, application user data, activity data, etc.) in device data database 146 on server device 140. Later, these applications and/or services on user device 102 can interact with network storage service 144 (e.g., through network storage module 112) to restore applications, application assets, application user data, activity data, etc., to user device 102, as described below.

Foreground Restore

Figure 2:
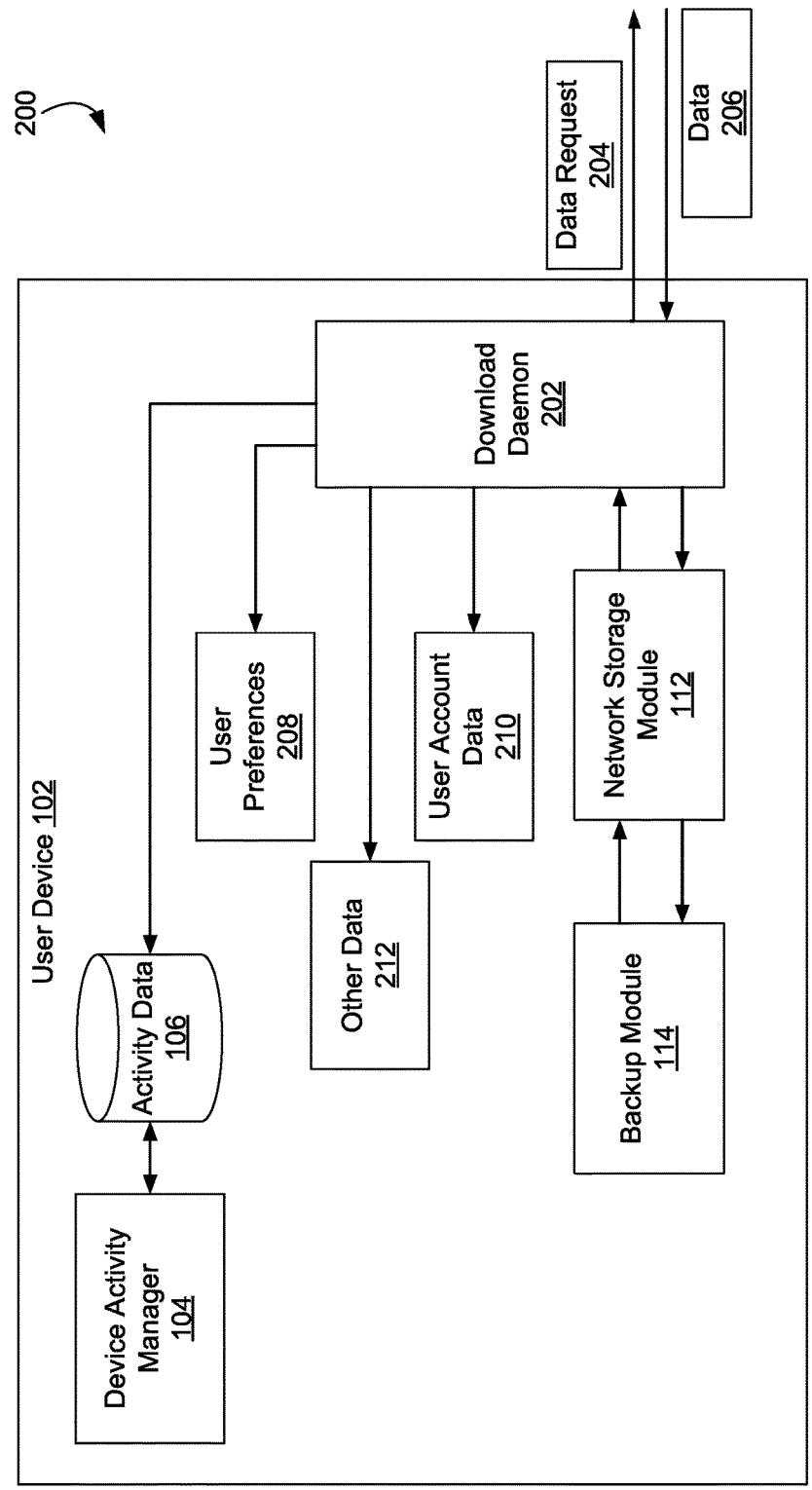
FIG. 2 is a block diagram of an example system for performing a foreground restore of data to a user device.

FIG. 2 is a block diagram of an example system 200 for performing a foreground restore of data to a user device. For example, system 200 can correspond to system 100 described above. System 200 may be configured to restore some data for user device 102 as a foreground process. For example, system 200 may restore operating system data, user preference data, user account data, etc., as a foreground process so that the core functionality of user device 102 can be restored before the user is allowed to operate user device 102.

In some implementations, backup module 114 can receive a request to initiate a restoration of user device 102. For example, a user may purchase a new user device 102 and configure the new user device 102 based on backup data stored for an old user device 102 on network server 140. A user may reformat an old user device 102 (e.g., delete applications, application data, etc.) and wish to restore applications, application data, device settings, etc., to the reformatted user device. In either case, in response to receiving user input to restore device data stored by server device 140 to user device 102, backup module 114 can initiate restoring data from server device 140 to user device 102 by performing a foreground restoration process.

To perform the foreground restoration process, backup module 114 can request from network storage module 112 data necessary to perform the background restoration process described below. Backup module 114 can send a request to network storage module 112 that includes the user account identifier associated with the user of user device 102, the device identifier for user device 102 and/or the identifier for the application or data requested by backup module 114. For example, backup module 114 can request that network storage module 112 download the activity data for activity data database 106 backed up at server device 140. Backup module 114 can request that network storage module 112 download the asset lists for assets previously backed up to server device 140 from user device 102. Backup module 114 can request that network storage module 112 download the user preferences data or any other device operating system data previously backed up to server device 140 from user device 102.

In response to receiving the requests, network storage module 112 can request that download daemon 202 download the identified data. For example, network storage module 112 can request that download daemon 202 download the asset lists, activity data, and/or user preferences data from server device 140. Download daemon 202 can then send data request 204 identifying the requested data, the user account associated with the user of user device 102, and/or identifying user device 102. Server device 104 can then look up the requested data in device data database 146 and send the data (e.g., data 206) to download daemon 202. Download daemon 202 can then store the activity data in activity data database 106, the user preferences as user preference 208, user account data as user account data 210, and/or any other data as other data 212 on user device 102. The operating system of user device 102 can then be configured based on the data downloaded during the foreground phase of the restoration process.

Prioritized Background Restore

Figure 3:
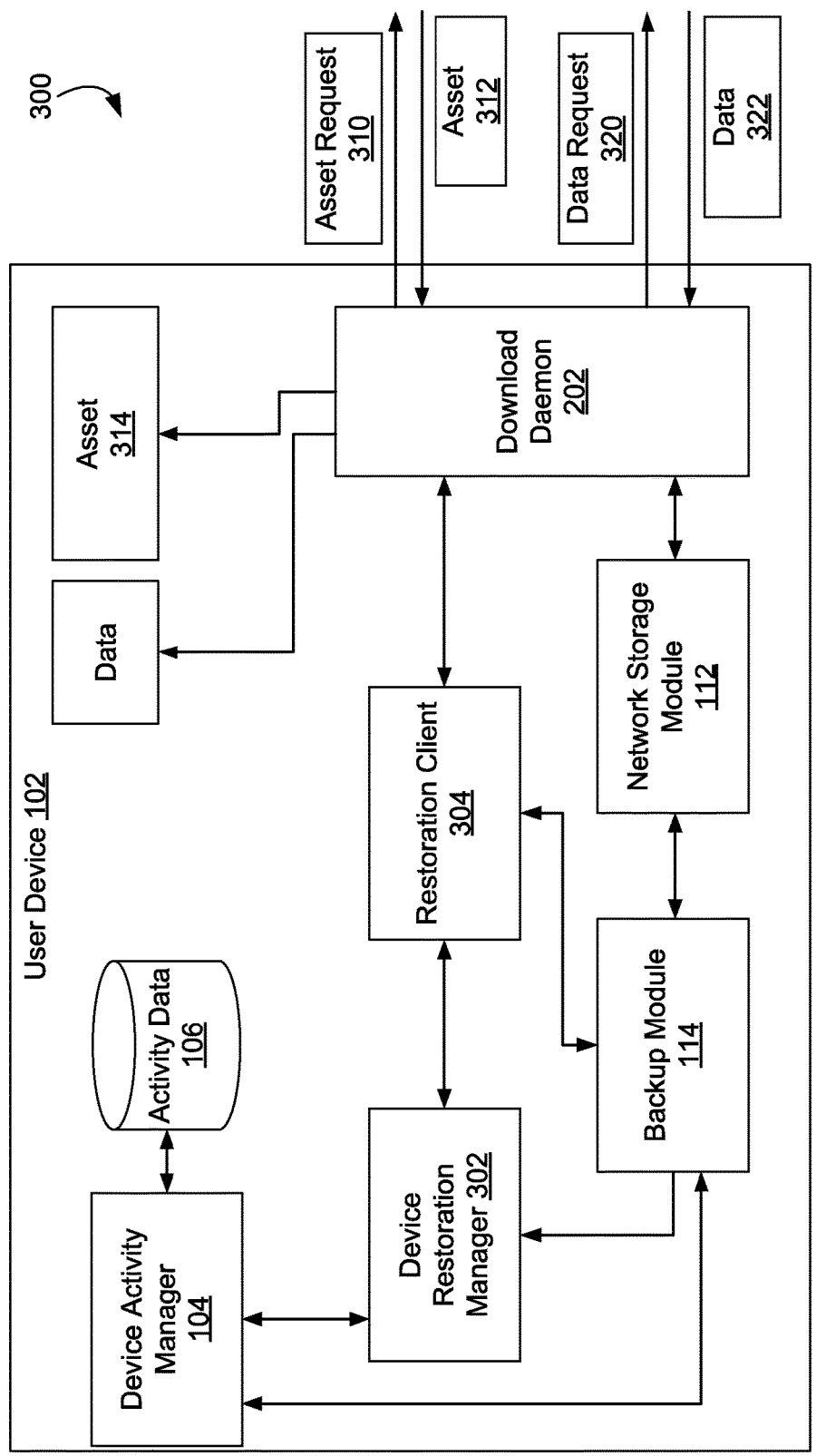
FIG. 3 is a block diagram of an example system for intelligently performing a background restore of data to a user device.

FIG. 3 is a block diagram of an example system 300 for intelligently performing a background restore of data to a user device. For example, system 300 can correspond to system 100 and/or system 200 described above. For example, system 300 can be configured to intelligently restore data to user device 102 such that the applications and/or application data the user is most likely to use first are restored first. Moreover, by limiting the background restoration of applications and/or application data to high priority data items, user device 102 can reduce the amount of computing resources (e.g., battery power, network data, CPU cycles, etc.) needed to restore user device 102 to a sufficient level of functionality for the user.

In some implementations, after performing the foreground phase of the restoration process, backup module 114 can initiate a background restoration of applications, application assets, and/or application user data to user device 102. For example, after backup module 114 recovers the lists of applications, assets, application user data, and activity data in the foreground restoration phase, backup module 114 can send a list of applications and/or assets that identifies applications and/or assets that need restoring to user device 102 to device restoration manager 302.

However, before sending the list of applications and/or assets to device restoration manager 302, backup module can request permission from device activity manager 104 to initiate the restoration process from device activity manager 104. As described above, device activity manager 104 can receive activity data or event data from applications, processes, utilities, operating system services, etc., running on user device 102. This activity data can relate to how and/or when a user is using applications and/or application assets on user device 102, as described above.

In some implementations, the activity data managed by device activity manager 104 can relate to computing resources of user device 102. For example, device activity manager 104 can be configured with energy budgets and/or data budgets that specify how much battery power, network data, etc., user device 102 can use for background tasks, such as the background restoration processes described herein. As applications or processes perform operations (e.g., activities) on user device 102, the applications or processes can report the activities along with estimated network data and/or battery usage information for the operations. Activity manager 104 can keep track of the network data and/or battery usage on user device 102 and determine when the network data and/or battery usage budgets have been met or exceeded by the background operations. The budgets can be maintained and/or replenished on a periodic basis (e.g., every 24 hours) so that additional network data and/or battery power can be allocated to and utilized by these background processes, applications, and/or operations even if the budget for a previous time period has been exceeded.

When device activity manager 104 receives a request for permission to perform an operation from a device activity manager client (e.g., backup module 114, device restoration manager 302, etc.), device activity manger 104 can determine whether the amount of data remaining in the network data budget and/or the amount of energy left in the battery power budget is enough to perform the requested operation. If the amount of data remaining in the network data budget and/or the amount of energy left in the battery power budget is enough to perform the requested operation, device activity manager 104 will grant permission to perform the requested operation. If the amount of data remaining in the network data budget and/or the amount of energy left in the battery power budget is not enough to perform the requested operation, device activity manager 104 will deny the requesting device activity manger client permission to perform the requested operation. In some implementations, device activity manager 104 can notify a denied client that the client can perform the requested operation when the data and/or energy budgets have been reset or replenished.

In some implementations, the activity data managed by device activity manager 104 can relate to environmental conditions of user device 102. For example, user device 102 can include various processes that monitor the operating state of user device 102. One of these monitoring processes can (e.g., periodically) monitor the operating temperature of user device 102 and report the temperature readings to device activity manager 104. Activity manger 104 can analyze the temperature readings to determine when user device 102 is overheating, for example, and prevent additional processing from being performed by user device 102 that might cause the temperature of user device 102 to increase.

When device activity manager 104 receives a request for permission to perform an operation from a device activity manager client (e.g., backup module 114, device restoration manager 302, etc.), device activity manger 104 can determine whether the environmental conditions of user device 102 are good enough to perform the requested operation. For example, if the current operating temperature of user device 102 is below some threshold level (e.g., user device 102 is not overheating), then device activity manger 104 can grant permission to perform the requested operation. If the current operating temperature of user device 102 is above some threshold level (e.g., user device 102 is overheating), then device activity manger 104 can deny permission to perform the requested operation.

In some implementations, backup module 114 can send a request to device activity manager 104 for permission to perform the background restoration process on user device 102. As described above, if the network data and/or energy budgets have not been exceeded yet and if the environmental conditions of user device 102 are good (e.g., the device is not overheating), then device activity manager 104 can grant permission to backup module 114 to initiate the background restoration process on user device 102. In response to receiving permission to initiate the background restoration process, backup module 114 can send a list of applications and/or assets to restore to device restoration manager 302. For example, the assets in the asset list can be grouped according to the applications corresponding to the assets so that device restoration manager 302 can restore applications and/or application assets according to application groups.

In some implementations, user device 102 can include device restoration manager 302. For example, device restoration manager 302 can manage and/or control restoration of applications, application assets, and/or application user data to user device 102 so that the restoration of the applications (e.g., including application assets, and/or application user data) can be performed without significantly impacting the user experience and/or usability of user device 102.

In some implementations, device restoration manager 302 can request permission from device activity manager to restore an application group. For example, device restoration manager 302 can send a request to device activity manager 104 that identifies the applications and/or assets in the application group and/or an estimate of the amount of data and/or energy required to restore the application group. Device activity manager 104 can determine whether sufficient network data and/or battery power remain in the data and/or energy budgets. Device activity manager 104 can determine whether the current environmental conditions of user device 102 are good enough to allow the restoration operation to proceed. When device activity manager 104 determines that enough data and/or energy budget remains for the restore operation and that the environmental conditions are good enough to allow the restore operation, device activity manager 104 can approve the restore operation for the application group.

In some implementations, device restoration manager 302 can request from device activity manager 104 a prediction of which applications and/or application assets the user is most likely to use on user device 102. For example, the prediction can be based on which applications and/or application assets the user has most recently used on user device 102 based on the historical activity or event data in activity data database 106. The prediction can be based on which applications and/or application assets the user has most frequently used based on the historical activity or event data in activity data database 106. In response to receiving the request, device activity manager 104 can send identifiers for a number (e.g., the top 10, the top 6, etc.) of applications and/or application assets that the user is most likely to use on user device 102. Device restoration manager 302 can then prioritize the applications and/or application assets identified by device activity manager 104 over other applications and/or application assets identified in the list of applications and/or assets received from backup module 114. For example, the applications and/or application assets identified by device activity manger 104 can be considered high priority applications and/or assets while the remaining applications and/or assets in the list received from backup module 114 can be considered low priority applications and/or application assets.

After determining high and low priority applications and/or assets, device restoration manager 302 can cause restoration client 304 to restore its application assets and/or application user data. For example, restoration client 304 can represent many different applications, processes, daemons, utilities, etc., on user device 102 that have backed up data to server device 140. Restoration client 304 can correspond to application 108 and/or application store client 110, for example.

Device restoration manager 302 can select a first restoration client 304 to restore based on the prioritized list of applications received from device activity manager 104. For example, the first restoration client 304 can correspond to the first application (e.g., a messaging application) identified in the list of prioritized applications received from device activity manager 104. If the first restoration client 304 does not exist on user device 102, device restoration manger 302 can request that application store client 110 (e.g., another restoration client 304) download and install the first restoration client 304 on user device 102.

When the first restoration client 304 is installed on user device 102, device restoration manager 302 can send a prioritized list of application asset identifiers (e.g., the top 5 message threads associated with the messaging application) corresponding to the first restoration client 304 to the first restoration client 304. The first restoration client 304 can then download the application assets by sending the application asset identifiers to download daemon 202. For example, download daemon 202 can perform operations for downloading an identified asset or data from various network sources, such as server device 140, on behalf of other processes, such as restoration client 304. The assets and/or data can be identified based on a uniform resource locator (URL) and download daemon 202 can use the URL to obtain the applications, application assets, and/or application user data from the network source (e.g., server device 140). For example, download daemon 202 can send asset request 310 to network storage service 144 on server device 140. Asset request 310 can include, for example, an identifier (e.g., URL) for the requested asset, the identifier for the user account associated with the user of user device 102, and/or the identifier for user device 102. Network storage service 144 can obtain the identified asset from device data database 146 based on the identifiers in asset request 310 and send the asset (e.g., asset 312) to download daemon 202 on user device 102. Download daemon 202 can then store the downloaded asset (e.g., asset 314) on user device 102.

After the assets for the first restoration client have been downloaded to user device 102, the first restoration client 304 can request that backup module 114 download application user data for the first restoration client 304. Backup module 114 can then send a request to network storage module 112 for the application user data and network storage module 112 can forward the request to download daemon 202. Download daemon 202 can then download the application user data. For example, download daemon 202 can send data request 320 to network storage service 144 on server device 140. Data request 320 can include, for example, an identifier (e.g., URL) for the requested application user data, the identifier for the user account associated with the user of user device 102, and/or the identifier for user device 102. Network storage service 144 can obtain the identified asset from device data database 146 based on the identifiers in data request 320 and send the application user data (e.g., data 322) to download daemon 202 on user device 102.

After the high priority assets associated with the first application group (e.g., application, application assets, and/or application user data) has been restored to user device 102, device restoration manager 302 can determine the second restoration client 304 (e.g., a photos application, social networking application, music application, etc.) in the high priority applications list and restore the application, application assets (e.g., photos, music, etc.), and/or application user data (e.g., preferences, settings, etc.) associated with the second restoration client 304, as described above with respect to the first restoration client. This process can continue until the high priority applications (e.g., including application, application assets, and/or application user data) have been restored to user device 102.

In some implementations, device restoration manager 302 can defer restoring low priority applications. For example, device restoration manager 302 can defer restoring low priority applications, application assets, and/or application user data until the context of user device 102 is such that downloading the low priority assets will not adversely affect the user's enjoyment of user device 102. For example, device restoration manager 302 can defer restoration of low priority applications and/or assets until the user device is connected to external power. Device restoration manager 302 can defer restoration of low priority applications and/or assets until the user device is connected to a Wi-Fi data connection. Device restoration manager 302 can defer restoration of low priority applications and/or assets until a time when the user is unlikely to use user device 102 (e.g., while the user is sleeping) as determined by device activity manager 104 and based on the historical activity or event data in activity data database 106.

While the context or conditions for initiating restoration of low priority items (e.g., applications, assets, etc.) are met, device restoration manager 302 can restore the low priority items to user device 102 using the processes described herein. For example, device restoration manager 302 can request permission from device activity manger 104 to restore low priority application assets to high priority restoration clients 304. For example, device activity manager 104 can request permission before restoring each restoration client 304. When device activity manager 104 grants permission to restore the low priority assets, device restoration manager 302 can send a list of identifiers for the low priority application assets to the corresponding high priority restoration client 304.

After restoring low priority assets to high priority applications, device restoration manager 302 can request permission from device activity manger 104 to restore low priority restoration clients 304. For example, device activity manager 104 can request permission before restoring each restoration client 304. When device activity manager 104 grants permission to restore a low priority restoration client 304, device restoration manager 302 can send a list of asset identifiers to the corresponding low priority restoration client 304 (e.g., application 108) to cause the low priority restoration client 304 to obtain the assets identified in the list, as described above.

In some implementations, device restoration manager 302 can reprioritize applications and/or application assets based on user input. For example, during the foreground restoration phase, backup module 114 can receive placeholder images for applications that will be restored to user device 102. These placeholders can be presented on a display of user device 102 while user device 102 is being restored even though the corresponding applications may not be restored yet on user device 102. If the user wishes to invoke an application that has not been restored yet, the user can select the placeholder image (e.g., icon) corresponding to the desired application. This user input can cause device restoration manager 302 to move the selected application to the top of the application priority list. Device restoration manager 302 can then restore the user selected application, and corresponding application assets and/or application user data, to user device 102 before the remaining applications in the high priority application list and/or low priority applications list, as described above.

Example Processes

Figure 4:
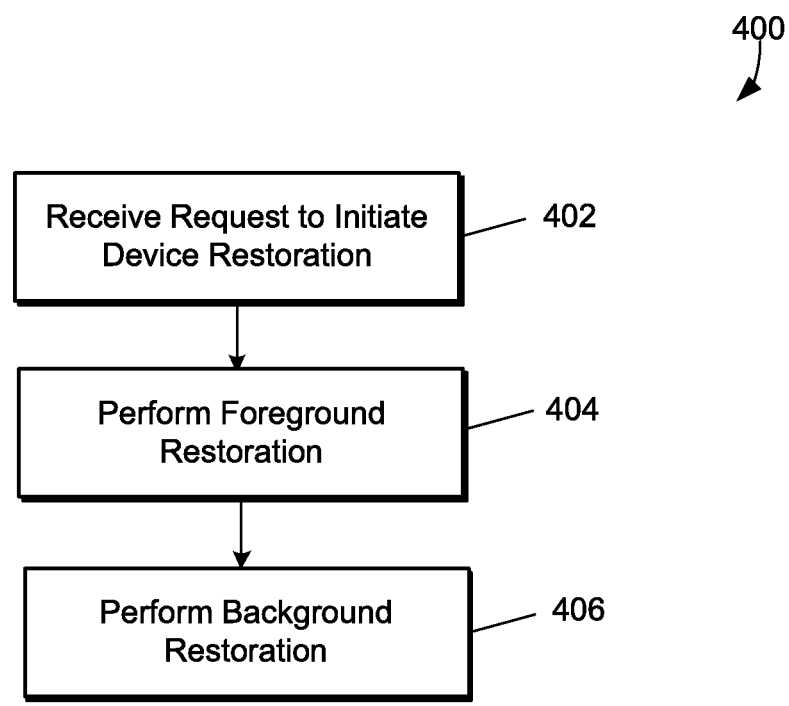
FIG. 4 is flow diagram of an example process for restoring data to a user device.

FIG. 4 is flow diagram of an example process 400 for restoring data to a user device. For example, process 400 can be performed by a user device to restore applications, application assets, and/or application user data to a user device. The restoration can be performed by a new user device to configure the new user device according to the settings and/or configuration of another (e.g., older or previous) user device. The restoration can be performed by a user device to restore data that has been lost or erased from the user device.

At step 402, the user device can receive a request to initiate a device restoration. For example, user device 102 can receive user input indicating that the user of user device 102 would like to restore previously saved applications, application assets, application settings, and/or operating system settings to user device 102.

At step 404, the user device can perform a foreground restoration. For example, the foreground restoration phase can be performed by user device 102 to restore core operating system functionality, operating system settings, activity data, and other data necessary to enable basic functions of user device 102, as described below with respect to FIG. 5. User device 102 can prevent the user from interacting with or freely using user device 102. For example, user device 102 may only allow a limited set of controlled interactions that allow the user to provide input to the foreground restoration process.

At step 406, the user device can perform a background restoration. For example, the background restoration phase can be performed by user device 102 to restore user applications, application assets (e.g., files, media, images, music, movies, etc.), and/or user application data (e.g., settings, configuration, preferences, etc.) to user device 102. The background restoration phase can be performed such that high priority applications and/or application assets can be restored quickly without negatively impacting the user's enjoyment of user device 102, while low priority applications and/or application assets can be delayed to a time when performing low priority updates will not interfere with the user's use and enjoyment of user device 102.

Figure 5:
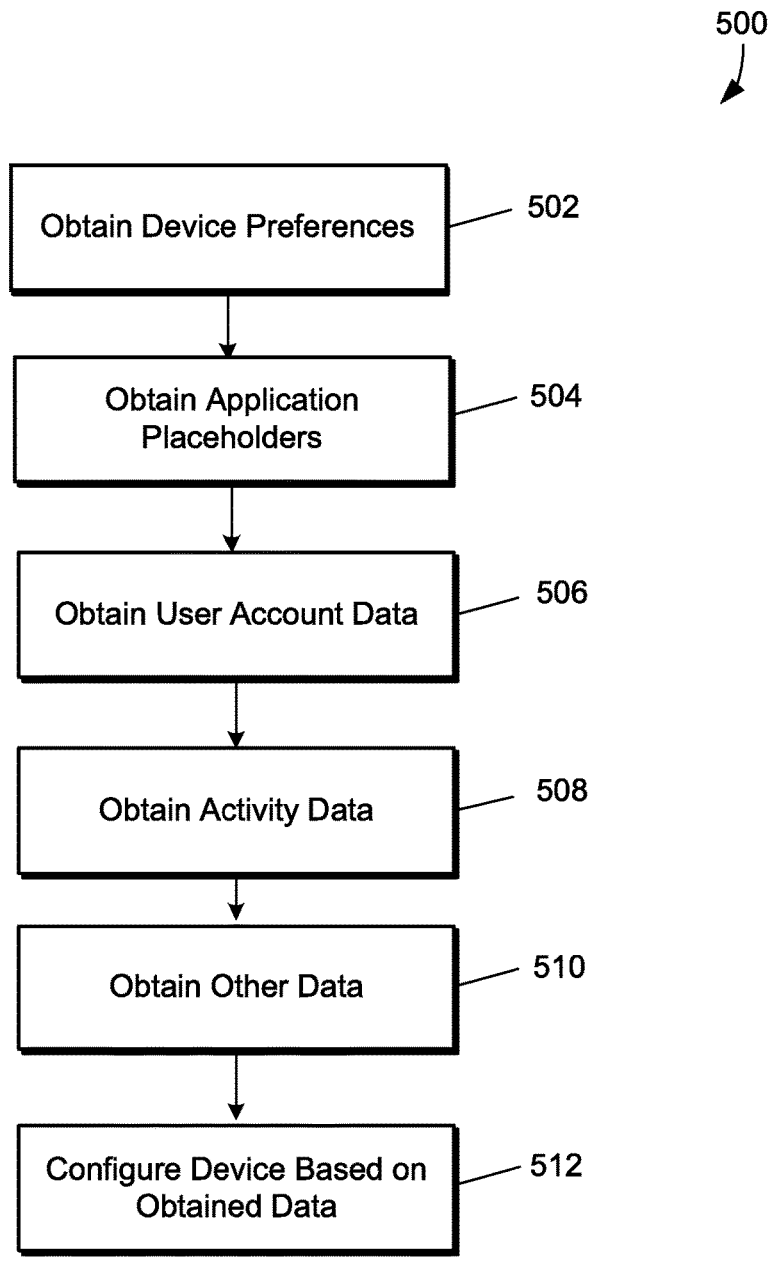
FIG. 5 is flow diagram of an example process for performing a foreground restore of data to a user device.

FIG. 5 is flow diagram of an example process 500 for performing a foreground restore of data to a user device. Process 500 may be performed by user device 102 to restore portions of device data for user device 102 as a foreground process. For example, process 500 may be performed by user device 102 to restore operating system data, user preference data, user account data, etc., as a foreground process so that the core functionality of user device 102 can be restored before the user is allowed to freely operate user device 102. The data restored using the foreground restore process 500 may have been previously saved to network server 104 by another user device as backup data. The data restored using the foreground restore process 500 may have been previously saved to network server 104 by user device 102 as backup data.

At step 502, the user device can obtain device preferences. For example, user device 102 can request and obtain user device preferences from network server 104. The user device preferences can be operating system preferences or other system preferences that the user has previously configured on a similar (or the same) user device.

At step 504, the user device can obtain application placeholders for applications to be restored to the user device. For example, user device 102 can obtain application placeholders for applications to be restored to user device 102 from server device 140. The application placeholders can be images or icons representing applications that have not yet been downloaded and/or installed on user device 102. The application placeholders can be presented on a display of user device 102 to represent the applications that will be installed on user device 102.

At step 506, the user device can obtain user account data. For example, user device 102 can obtain user account data for configuring user email accounts, user application store accounts, user social media accounts, and/or other user accounts that the user has previously configured on a user device. User device 102 can obtain the user account data from server device 140.

At step 508, the user device can obtain activity data. For example, user device 102 can obtain from server device 140 activity or event data for activity data database 106 that was previously stored on server device 140. User device 102 can restore the activity data so that device activity manager 104 can determine which applications and/or application assets the user is most likely to use when the user uses user device 102.

At step 510, the user device can obtain other device data. For example, user device 102 can obtain from server device 140 other data necessary for user device 102 to provide basic or core functionality or restore data to user device 102. This other data can include lists of application and/or asset identifiers that should be restored to user device 102 during the background restore process described below.

At step 512, the user device can configure the user device based on the obtained data. For example, user device 102 can configure its operating system, activity data database 106, user accounts, and other features based on the data obtained at steps 502-510.

Figure 6:
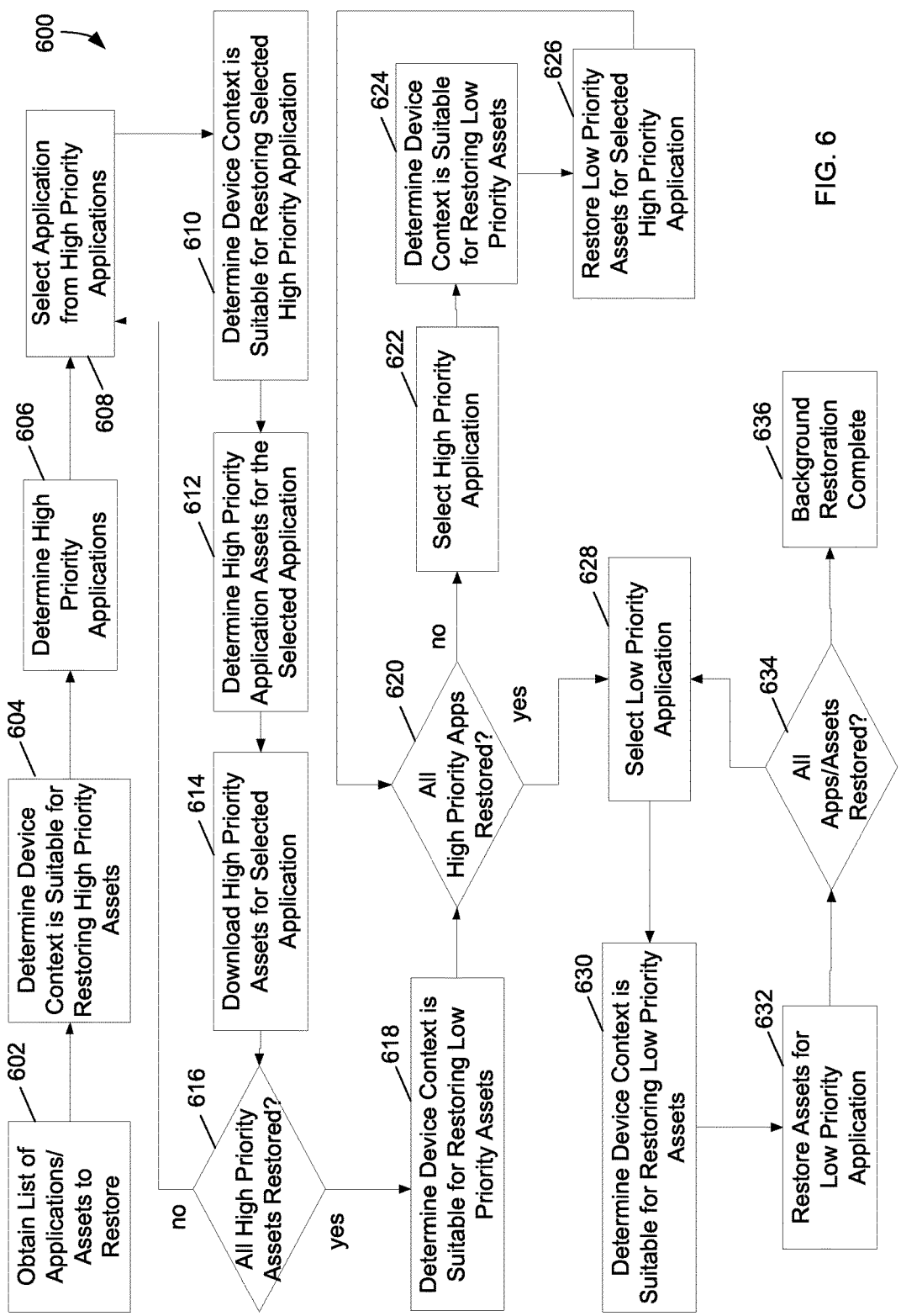
FIG. 6 is a flow diagram of an example process for intelligently performing a background restore of data to a user device.

FIG. 6 is a flow diagram of an example process 600 for intelligently performing a background restore of data to a user device. For example, process 600 can be performed by user device 102 to intelligently restore data to user device 102 such that the applications and/or application data the user is most likely to use first (e.g., high priority items) are restored first. Moreover, by limiting (at least in the near term) the background restoration of applications and/or application data to high priority data items, process 600 can reduce the amount of computing resources (e.g., battery power, network data, CPU cycles, etc.) needed by user device 102 to restore user device 102 to a sufficient level of functionality for the user. While process 600 is presented as a sequential process to make it easier for the reader to understand process 600, some or all of the steps described with respect to process 600 can be performed in parallel. Thus, many applications and assets may be identified and restored to user device 102 at or around the same time.

At step 602, a user device can obtain a list of applications and/or assets to restore to user device. For example, backup module 114 on user device 102 can obtain the list of applications and/or assets to restore to user device 102 from server device 140. The list (e.g., asset restore list) of applications and/or assets to restore may have been previously saved to server device 140 by user device 102 or another user device.

At step 604, the user device can determine whether the current device context is suitable for restoring high priority assets. For example, backup module 114 can request permission from device activity manager 104 to perform the background restoration of high priority applications and/or assets. Device activity manager 104 can determine whether to grant permission to perform the background restoration of applications and/or assets based on the current device context. The current device context can include the status of energy (e.g., battery) and network data budgets. The current device context can include the environmental status (e.g., thermal conditions, etc.) of user device 102. If the energy and data budgets have not been exceeded and the environmental status is good, then device activity manager 104 can allow the background restoration of high priority applications and/or assets to proceed. If the energy and data budgets have been exceeded or the environmental status is not good, then device activity manager 104 can prevent the background restoration of high priority applications and/or assets from proceeding and notify backup module 114 when the device context becomes suitable for restoring high priority assets.

At step 606, the user device can determine high priority applications. For example, after backup module 114 receives permission to proceed with restoring the high priority applications and/or assets, backup module 114 can send the list of applications and/or application assets to restore to device restoration manager 302. Device registration manager 302 can request a list of high priority applications from device activity manager 104. Device activity manager 104 can determine the list of high priority applications based on historical data stored in activity data database 106. For example, device activity manager 104 can determine, based on the historical data, which applications the user has recently used or which applications the user most frequently used. The applications that the user has recently used or has most frequently used can be identified as the high priority applications. Device activity manager 104 can, for example, determine the top five (e.g., or top seven, or top ten, etc.) most frequently or most recently used applications, generate a list that identifies these high priority applications, and send the list to device restoration manager 302.

At step 608, the user device can select an application from the high priority applications list. For example, device restoration manager 302 can select the highest priority application from the high priority applications list that has not yet been restored. For example, when device restoration manager 302 selects an application from the list, device restoration manager 302 can remove the application from the list. Thus, the list may only include applications that need to be restored and when the list is empty device restoration manager 302 can determine that all of the high priority assets for the high priority applications have been restored. Device restoration manager 302 can determine whether the selected application is installed on user device 102. If the application is not installed on user device 102, device restoration manager 302 can request that application store client 110 download and install the selected application on user device 102.

In some implementations, when a user selects an application and/or asset during the background restore phase that has not yet been restored, a message can be sent to device restoration manager 302 identifying the application and/or asset selected by the user. Device restoration manager 302 can then prioritize restoration of the user-selected application and/or asset such that the user-selected application and/or asset is restored next (e.g., after the application and/or asset currently being restored is restored to user device 102). For example, the user-selected application and/or asset becomes the highest priority application and/or asset on the high priority applications list or high priority assets list (described below).

At step 610, the user device can determine whether the device context is suitable for restoring the high priority application. For example, each time device restoration manager 302 selects an application to restore, device restoration manager 302 can request permission to perform the restoration operation from device activity manager 104. As described above, device activity manager 104 and determine whether to allow the restoration operation based on data budgets, energy budgets, thermal conditions, and/or other device contexts.

At step 612, the user device can determine high priority application assets for the selected application. For example, device restoration manager 302 can request a list of high priority assets associated with the selected application from device activity manager 104. Device activity manager 104 can determine, based on the historical activity data (e.g., usage data) stored in activity data database 106, which assets associated with the selected application were most recently used or most frequently used by the user of user device 102. Device activity manager 104 can then generate a list that includes identifiers for a number (e.g., the top 5, the top 8, etc.) most frequently used or most recently used assets associated with the selected application and send the list to device restoration manager 302.

At step 614, the user device can download the high priority assets for the selected application. For example, device restoration manager 302 can send (e.g., restoration client 304) the list of high priority assets to the selected application in a request to download the assets identified in the list. The selected application can then request that download daemon 202 download the identified assets from server device 140. Download daemon 202 can download the identified assets and store the downloaded assets on user device 102. Additionally, application user data for the selected application can be downloaded to user device 102, as described above.

At step 616, the user device can determine whether all high priority assets have been restored to the user device. For example, device restoration manager 302 can determine whether there are additional high priority applications in the list received from device activity manager 104 that have not yet had their high priority assets restored. For example, when device restoration manager 302 selects a high priority application from the high priority applications list, device restoration manager 302 can remove the selected application from the list. If high priority applications remain in the list at step 616, then device restoration manager 302 can select the next application in the list at step 608. If the list is empty (e.g., all high priority applications have been selected and corresponding high priority assets downloaded), then process 600 can proceed to step 618.

At step 618, the user device can determine that the device context is suitable for restoring low priority assets. For example, device restoration manager 302 can defer or delay restoring low priority assets until the device context will allow device restoration manager 302 to download low priority assets (e.g., low priority assets for high priority applications, low priority applications and corresponding assets) without impacting the user's use and/or enjoyment of the user device. For example, the device context can include various states of the user device, such as the device is in a charging state, connected to external power, connected to Wi-Fi, etc. The device context can be determined based on user activity. For example, the device context can include a prediction by device activity manager 104 that the will not use the device in a current time period (e.g., for the next 15 minutes, for the next hour, etc.) or that the user is sleeping. When user device 102 (e.g., device activity manager 104 and/or device restoration manager 302) determines that user device 102 is plugged into external power, connected to Wi-Fi, and/or when user device 102 predicts that the user will not use user device 102 within the current time period, then device restoration manager 302 can determine that the device context is suitable for restoring low priority assets to user device 102.

At step 620, the user device can determine whether all high priority applications have been restored. For example, at this point in the process, all high priority assets for high priority applications have been restored. However, some of the high priority applications may have low priority assets that have not yet been restored. Device restoration manager 302 can obtain the high priority applications list from device activity manager 104, as described above, and determine, based on the asset restore list received from backup module 114, whether the high priority applications identified by device activity manger 104 have any additional (e.g., low priority) assets that should be restored to user device 102. When the asset restore list includes assets that have not yet been downloaded for the high priority applications, device restoration manager 302 can select a high priority application to restore at step 622. When all assets (high and low priority assets) for the high priority applications have been restored, process 600 can move to step 628.

At step 622, the user device can select an application from the high priority applications list. For example, device restoration manager 302 can select the highest priority application from the high priority applications list that has not yet been restored. For example, when device restoration manager 302 selects an application from the list, device restoration manager 302 can remove the application from the list. Thus, the list may only include applications that need to be restored and when the list is empty device restoration manager 302 can determine that all of the high priority assets for the high priority applications have been restored. Device restoration manager 302 can determine whether the selected application is installed on user device 102. If the application is not installed on user device 102, device restoration manager 302 can request that application store client 110 download and install the selected application on user device 102.

At step 624, the user device can determine that the device context is suitable for restoring low priority assets. For example, device activity manager 104 and/or device restoration manager can determine that user device 102 is still connected to external power, connected to Wi-Fi, and/or that the user is still not using user device 102.

At step 626, the user device can restore low priority assets for the selected high priority application. For example, device restoration manager 302 can send a list of assets (e.g., asset identifiers) associated with the selected application to the selected application. The selected application can then download the assets identified in the list of assets. After the assets for the selected applications have been restored, process 600 can return to step 620 to determine whether all of the high priority applications (e.g., including corresponding high and low priority assets) have been restored. For example, if device restoration manager 302 determines that all high priority applications have been restored at step 620, process 600 can continue to step 628 to restore low priority applications.

At step 628, the user device can select a low priority application. For example, at this point in the process, all high priority applications, including application assets, have been restored. Thus, the only applications in the asset restoration list that need to be restored are the low priority applications and their respective application assets. Device restoration manager 302 can select an unrestored application from the asset list at step 628. If the selected application is not installed on user device 102, device restoration manager 302 can send a request to application store client 110 to cause application store client to download and/or install the selected application on user device 102.

At step 630, the user device can determine that the device context is suitable for restoring low priority assets. For example, device activity manager 104 and/or device restoration manager 302 can determine that user device 102 is still connected to external power, connected to Wi-Fi, and/or that the user is still not using user device 102.

At step 632, the user device can restore assets for the selected low priority application. For example, device restoration manager 302 can determine which assets in the asset restore list are associated with the selected low priority application and generate an asset list identifying the assets. Device restoration manager 302 can send the list of assets (e.g., asset identifiers) to the selected application and the selected application can download the identified assets to user device 102, as described above. Additionally, application user data for the selected application can be downloaded to user device 102, as described above.

At step 634, the user device can determine whether all applications and/or assets have been restored to the user device. For example, when device restoration manager 302 determines that all assets identified in the asset restore list have been restored to user device 102, process 600 can end at step 636 where background restoration of assets is completed. However, when device restoration manager 302 determines that all assets identified in the asset restore list have not been restored to user device 102, device restoration manager 302 can continue process 600 at step 628 by selecting the next low priority application and/or asset to restore to user device 102.

While the processes described above may be described as separate processes using specific steps in a particular order, it should be understood that the steps of different processes may be combined to produce similar processes and/or outcomes. Furthermore, one or more of the steps of the processes described above may be rearranged, performed in a different order, or omitted while still staying within the contemplated scope of the technology described herein. For example, steps of one process may be added to another process and/or steps of one process may be omitted while still staying within the contemplated scope of the technology described herein.

Use Cases

The above systems and processes can be implemented to enable intelligent restoration of assets (e.g., applications, application assets, application user data, etc.) to a user device. Example use cases where this technology improves the user experience and functioning of the user device are described below.

For example, user device 102 can include a photos application that allows a user to view and/or edit photos (e.g., assets) on user device 102. The user may use the photos application to view or edit a photo and then user device 102 performs a backup to server device 140. When the user later initiates a restoration of data from server device 140, the photo that was recently viewed by the user is prioritized and restored before other photos.

As another example, user device 102 includes 100 applications. The user of user device 102 frequently uses five out of the 100 applications. When the user initiates a restoration of user device 102, the five most frequently used applications (e.g., including corresponding assets and user data) will be downloaded and restored first.

As a third example, user device 102 can include a messaging application. The user may frequently send messages on two of the ten threads (e.g., assets) managed by the messaging application. When the user device 102 is restored, the two threads the user most frequently uses will be prioritized over the other eight message threads and will be restored first.

In a fourth example, user device 102 includes a music application. The user mainly listens to ten songs (e.g., assets) in their music library. When the user initiates a restoration of user device 102, these ten songs will be prioritized and restored before the other songs in the user's music library.

Other assets subject to the background restore prioritization mechanisms described above can include electronic books, videos, podcasts, voice memos, and/or other digital assets that a user might interact with on user device 102.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 7:
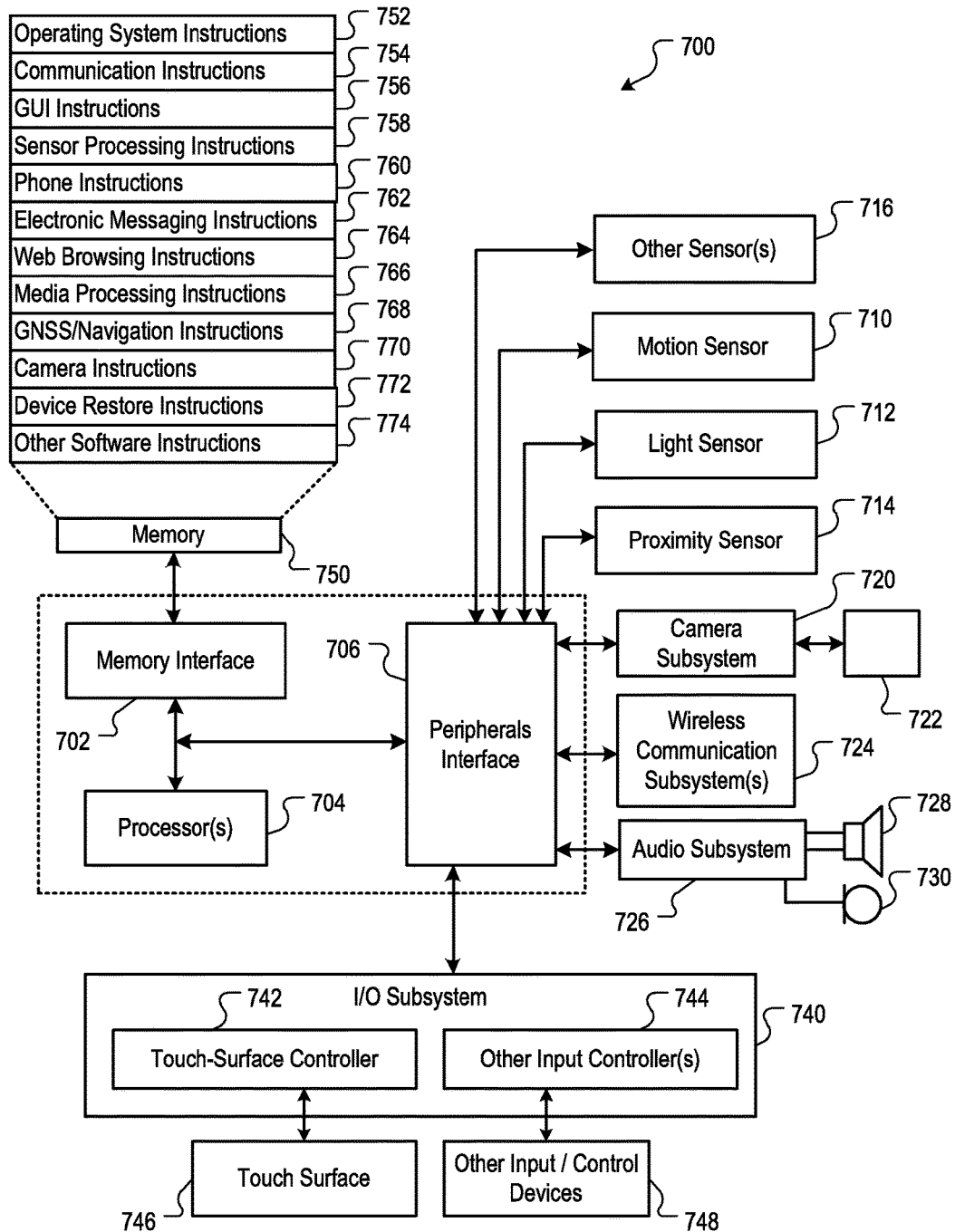
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the device restoration features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the device restoration processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:
1. A method comprising:
obtaining, by a computing device from a server device, historical usage data describing a user's interactions with applications and assets on the computing device;
determining, by the computing device, a plurality of high priority applications to restore to the computing device based on the historical usage data;

determining, by the computing device, a plurality of low priority applications to restore to the computing device based on the historical usage data;

selecting, by the computing device, a first application from the high priority applications to restore to the computing device;

determining, by the computing device, whether a context of the computing device meets a first criteria suitable for restoring high priority applications;

restoring, by the computing device, the first application to the computing device when the context of the computing device meets a first criteria that is suitable for restoring high priority applications, wherein restoring the first application to the computing device comprises:

determining, by the computing device, high priority assets corresponding to the first application based on the historical usage data;

determining, by the computing device, low priority assets corresponding to the first application based on the historical usage data, wherein the high priority assets and the low priority assets comprise content accessed via the first application when the first application is operational;

restoring, by the computing device, the high priority assets corresponding to the first application to the computing device;

determining, by the computing device, whether the context of the computing device meets a second criteria, different than the first criteria, that is suitable for restoring the low priority assets subsequent to the restoration of the high priority assets; and deferring, by the computing device, restoration of the low priority assets until the context of the computing device meets the second criteria that is suitable for restoring the low priority assets;

determining, by the computing device, whether the context of the computing device is suitable for restoring the low priority applications subsequent to the restoration of the high priority applications; and deferring, by the computing device, restoration of the low priority applications until the context of the computing device is suitable for restoring low priority applications.

2. The method of claim 1, where determining the plurality of high priority applications to restore to the computing device based on the historical usage data includes identifying applications that were most recently used by a user of the computing device.

3. The method of claim 1, where determining the plurality of high priority applications to restore to the computing device based on the historical usage data includes identifying applications that were most frequently used by a user of the computing device.

4. The method of claim 1, where determining whether a context of the computing device meets a first criteria suitable for restoring high priority applications includes determining whether an energy budget for the computing device has been exceeded.

5. The method of claim 1, where determining whether a context of the computing device meets a first criteria suitable for restoring high priority applications includes determining whether a network data budget for the computing device has been exceeded.

6. The method of claim 1, where determining whether a context of the computing device meets a first criteria suitable for restoring high priority applications includes determining whether a temperature of the computing device is above a threshold temperature.

7. The method of claim 1, where determining whether the context of the computing device meets a second criteria that is suitable for restoring the low priority assets includes determining whether an energy budget for the computing device has been exceeded, a network data budget for the computing device has been exceeded, a temperature of the computing device is above a threshold temperature, or any combination thereof.

8. A non-transitory computer readable medium including one or more sequences of instructions that, when executed by one or more processors, cause the processors to perform operations comprising:

obtaining, by a computing device from a server device, historical usage data describing a user's interactions with applications and assets on the computing device;

determining, by the computing device, a plurality of high priority applications to restore to the computing device based on the historical usage data;

determining, by the computing device, a plurality of low priority applications to restore to the computing device based on the historical usage data;

selecting, by the computing device, a first application from the high priority applications to restore to the computing device;

determining, by the computing device, whether a context of the computing device meets a first criteria suitable for restoring high priority applications;

restoring, by the computing device, the first application to the computing device when the context of the computing device meets a first criteria that is suitable for restoring high priority applications, wherein restoring the first application to the computing device comprises:

determining, by the computing device, high priority assets corresponding to the first application based on the historical usage data;

determining, by the computing device, low priority assets corresponding to the first application based on the historical usage data, wherein the high priority assets and the low priority assets comprise content accessed via the first application when the first application is operational;

restoring, by the computing device, the high priority assets corresponding to the first application to the computing device;

determining, by the computing device, whether the context of the computing device meets a second criteria, different than the first criteria, that is suitable for restoring the low priority assets subsequent to the restoration of the high priority assets; and deferring, by the computing device, restoration of the low priority assets until the context of the computing device meets the second criteria that is suitable for restoring the low priority assets;

determining, by the computing device, whether the context of the computing device is suitable for restoring the low priority applications subsequent to the restoration of the high priority applications; and deferring, by the computing device, restoration of the low priority applications until the context of the computing device is suitable for restoring low priority applications.

9. The non-transitory computer readable medium of claim 8, where the instructions that cause determining the plurality of high priority applications to restore to the computing device based on the historical usage data include instructions that cause identifying applications that were most recently used by a user of the computing device.

10. The non-transitory computer readable medium of claim 8, where the instructions that cause determining the plurality of high priority applications to restore to the computing device based on the historical usage data include instructions that cause identifying applications that were most frequently used by a user of the computing device.

11. The non-transitory computer readable medium of claim 8, where the instructions that cause determining whether a context of the computing device meets a first criteria suitable for restoring high priority applications include instructions that cause determining whether an energy budget for the computing device has been exceeded.

12. The non-transitory computer readable medium of claim 8, where the instructions that cause determining whether a context of the computing device meets a first criteria suitable for restoring high priority applications include instructions that cause determining whether a network data budget for the computing device has been exceeded.

13. The non-transitory computer readable medium of claim 8, where the instructions that cause determining whether a context of the computing device meets a first criteria suitable for restoring high priority applications include instructions that cause determining whether a temperature of the computing device is above a threshold temperature.

14. The non-transitory computer readable medium of claim 8, where the instructions that cause determining whether the context of the computing device meets a second criteria that is suitable for restoring the low priority assets includes determining whether an energy budget for the computing device has been exceeded, a network data budget for the computing device has been exceeded, a temperature of the computing device is above a threshold temperature, or any combination thereof.

15. A system comprising:
one or more processors; and
a non-transitory computer readable medium including one or more sequences of instructions that, when executed by the one or more processors, cause the processors to perform operations comprising:
obtaining, by the system from a server device, historical usage data describing a user's interactions with applications and assets on the computing device;
determining, by the system, a plurality of high priority applications to restore to the computing device based on the historical usage data;
determining, by the system, a plurality of low priority applications to restore to the computing device based on the historical usage data;
selecting, by the system, a first application from the high priority applications to restore to the computing device;
determining, by the computing device, whether a context of the computing device meets a first criteria suitable for restoring high priority applications;
restoring, by the computing device, the first application to the computing device when the context of the computing device meets a first criteria that is suitable for restoring high priority applications, wherein restoring the first application to the computing device comprises:
determining, by the computing device, high priority assets corresponding to the first application based on the historical usage data;
determining, by the computing device, low priority assets corresponding to the first application based on the historical usage data, wherein the high priority assets and the low priority assets comprise content accessed via the first application when the first application is operational;
restoring, by the computing device, the high priority assets corresponding to the first application to the computing device;
determining, by the computing device, whether the context of the computing device meets a second criteria, different than the first criteria, that is suitable for restoring the low priority assets subsequent to the restoration of the high priority assets; and
deferring, by the computing device, restoration of the low priority assets until the context of the computing device meets the second criteria that is suitable for restoring the low priority assets;
determining, by the computing device, whether the context of the computing device is suitable for restoring the low priority applications subsequent to the restoration of the high priority applications; and
deferring, by the computing device, restoration of the low priority applications until the context of the computing device is suitable for restoring low priority applications.

16. The system of claim 15, where the instructions that cause determining the plurality of high priority applications to restore to the computing device based on the historical usage data include instructions that cause identifying applications that were most recently used by a user of the computing device.

17. The system of claim 15, where the instructions that cause determining the plurality of high priority applications to restore to the computing device based on the historical usage data include instructions that cause identifying applications that were most frequently used by a user of the computing device.

18. The system of claim 15, where the instructions that cause determining whether a context of the computing device meets a first criteria suitable for restoring high priority applications include instructions that cause determining whether an energy budget for the computing device has been exceeded.

19. The system of claim 15, where the instructions that cause determining whether a context of the computing device meets a first criteria suitable for restoring high priority applications include instructions that cause determining whether a network data budget for the computing device has been exceeded.

20. The system of claim 15, where the instructions that cause determining whether a context of the computing device meets a first criteria suitable for restoring high priority applications include instructions that cause determining whether a temperature of the computing device is above a threshold temperature.

21. The system of claim 15, where the instructions that cause determining whether the context of the computing device meets a second criteria that is suitable for restoring the low priority assets includes determining whether an energy budget for the computing device has been exceeded, a network data budget for the computing device has been exceeded, a temperature of the computing device is above a threshold temperature, or any combination thereof.

\* \* \* \* \*